United States Patent Office 3,217,665
Patented Nov. 16, 1965

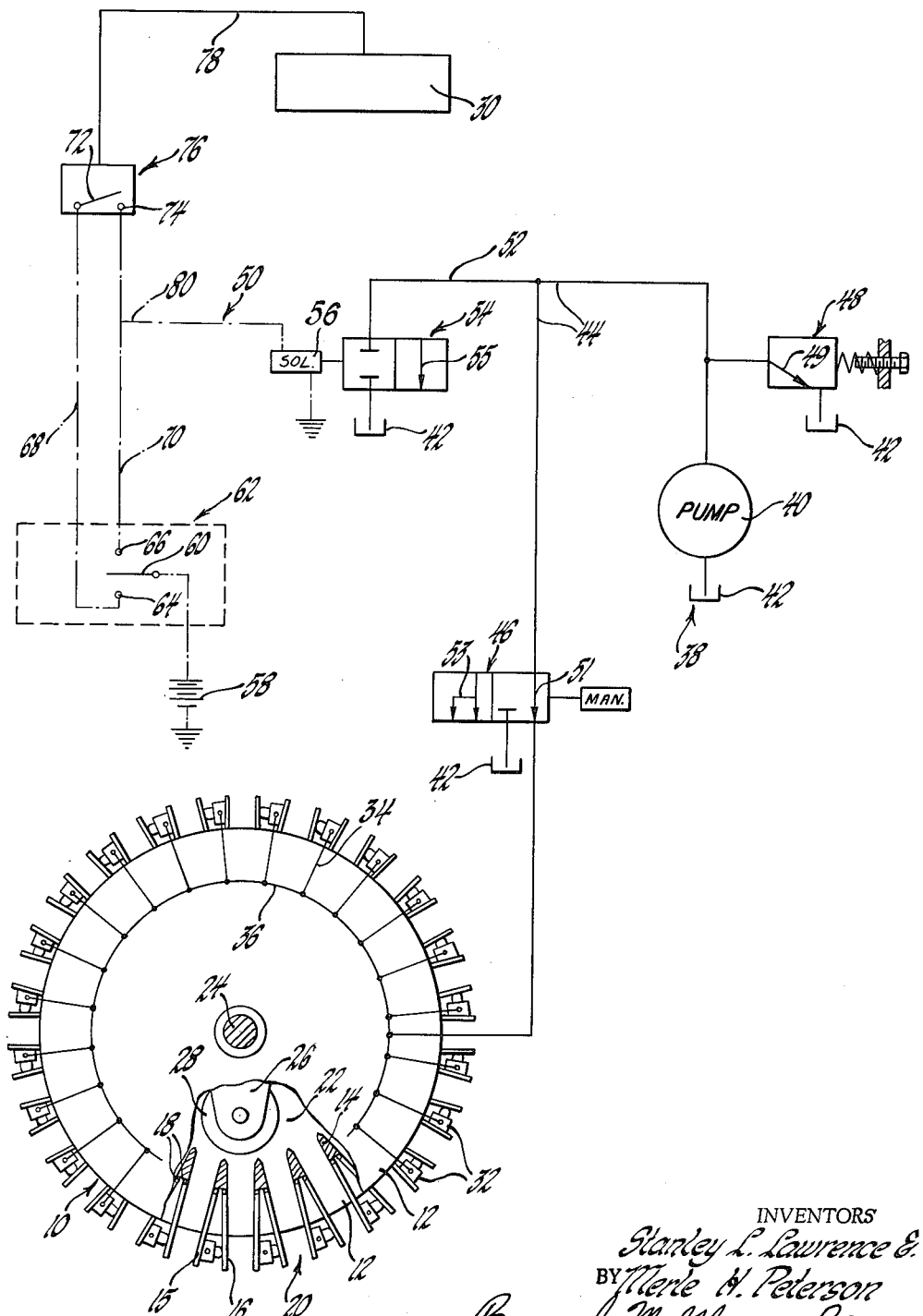

3,217,665
DIE CELL CONTROL SYSTEM FOR HAY
WAFERING APPARATUS
Stanley L. Lawrence and Merle H. Peterson, Livonia,
Mich., assignors to Massey-Ferguson Incorporated, Detroit, Mich., a corporation of Maryland
Filed Feb. 20, 1963, Ser. No. 259,925
21 Claims. (Cl. 107—14)

This invention relates to an apparatus for producing compressed hay wafers and, in particular, to an apparatus for field wafering forage crops into hay wafers which is particularly characterized by means for automatically controlling the disposition of the die cells of the wafering apparatus in accordance with the flow conditions of hay being wafered therethrough.

In recent times, apparatus have been devised for field wafering forage crops into hay wafers comprising means for supplying hay, preferably preconditioned or processed, finely chopped, mixed and blended hay from a windrow within a field, to a hopper communicating with a wafering chamber at one end thereof which, in turn, communicates with the entrance ends of an annular series of axially open die cells, each of which is of variable converging cross sectional area from its entrance end to its exit end. Hydraulically operated motor assemblies have been associated with opposite movable walls of each of the die cells to adjust the variable cross sectional areas thereof to a substantially uniform extent and, hence, the resistance to an extrusion of hay being compressed therethrough. Rotary hay compaction or compression means has also been provided for compacting or compressing hay received within the wafering chamber into and through the die cells. As a result, as the apparatus moves through a field of mown hay, a continuous extrusion of compressed or compacted hay emerges from the exit ends of the respective die cells, and each extrusion is adapted to be engaged with an ejection means adjacent the exit end of the associated die cell to break the respective extrusions of hay into hay wafers which then preferably fall upon conveyor means for removal from the apparatus.

In an apparatus of the type aforementioned, and with a suitable source supplying fluid at an adjustable and preselectable control pressure to the aforementioned motor means to adjust the convergent cross sectional areas of the die cells to some pre-selected substantially uniform extent as aforementioned, it often happens for one reason or another, such as simply the fact that unequal amounts of hay are available within the wafering chamber for compression through respective ones or groups of the die cells, that a pause occurs in the flow of hay being compressed through various ones of the respective die cells. When such pauses occur, apparently, the heat generated within the die cells by the wafering apparatus at least partially dries the hay causing it to stick within the die cells. Hay then tends to clog or build up within the affected die cells resulting in choking, partially or wholly, the flow of hay being compressed therethrough as the rotary hay compression means aforementioned continues to attempt to compress hay into and through the die cells. As a consequence, a non-uniform rate of flow of compressed extrusions of hay occurs through the respective die cells which is, of course, highly undesirable during operation of the wafering apparatus, and the aforementioned choking action imposes greater and greater loads on the engine driving the rotary hay compression means and the choking action and the loads imposed thereby often become severe enough to cause the engine to stall, which is likewise highly undesirable.

In view of the foregoing considerations, the present invention contemplates an improved apparatus of the general type aforementioned including a series of axially open die cells each being adjustably convergent in cross sectional area between axially opposite entrance and exit ends thereof, the entrance ends of such series of die cells being disposed opposite hay compaction or compression means for compacting or compressing hay into and through the die cells to form wafers, and is particularly characterized by means for automatically adjusting the convergent cross sectional areas of the die cells in response to a predetermined variation in the rate of flow of hay being compacted or compressed therethrough.

More specifically in this regard, the invention is particularly characterized by the fact that the aforementioned means for automatically adjusting the convergent cross sectional areas of the respective die cells is adapted to operate automatically in response to a predetermined variation in an operating condition of the engine driving the aforementioned rotary hay compression means, such operating condition preferably consisting of the speed of operation of the engine, or the load imposed thereon, or the vacuum pressure in the intake manifold thereof. Thus, the convergent cross sectional areas of the die cells are increased or opened when a clogging or choking condition occurs in any one or group of die cells to such an extent as to reduce the speed of the engine a predetermined amount or to impose a predetermined increased load thereon or to result in a predetermined decrease in manifold vacuum, whereby the die cell areas allow the hay to pass therethrough at a more uniform rate than otherwise would occur while preventing stalling of the engine.

In its more specific aspects, the invention is particularly characterized by a control system for the aforementioned die cells comprising a source of fluid under an adjustable and preselectable control pressure, supply conduit means communicating said source and such control pressure with the aforementioned motor means to initially adjust the cross sectional areas of the respective die cells to a substantially uniform extent for the wafering operation, exhaust conduit means including control valve means communicating with such motor means, such control valve means being movable between a first position preventing flow of fluid through the exhaust conduit means and a second position permitting such flow therethrough, and means for automatically moving the control valve means to its second position to relieve the aforementioned control pressure from the motor means to automatically increase the convergent cross sectional areas of the respective die cells in response to a predetermined decrease in rate of flow of hay being compressed therethrough as sensed by a predetermined decrease in the manifold vacuum of the engine driving the rotary hay compression means and which is indicative of increased loads imposed thereon, thereby resulting in a more uniform rate of flow of hay being wafered from the die cells, and prevention of deleterious clogging or choking of the die cells and consequent stalling of the engine.

In addition, the invention is further characterized by manually operable overcontrol means having multiple positions including a position completely deactivating the aforementioned control valve means to prevent automatic operation thereof as aforedescribed, a position activating the aforementioned control valve means for automatic operation thereof, and a third position again deactivating the control valve means to prevent automatic operation thereof while directly activating it to increase the areas of the die cells completely independently of sensing a wafering or engine operating condition as aforedescribed.

In order to facilitate an understanding of the invention, a preferred embodiment thereof will now be described with reference to the accompanying drawing in which:

The sole figure in the drawing is primarily a schematic illustration of a known hay wafering apparatus equipped with a preferred embodiment of the die cell control system of the present invention.

As aforementioned, the sole figure of the drawing is primarily schematic in nature in view of the fact that the specific construction of the wafering apparatus or, in other words, those components thereof which pick up, feed and compress or compact hay into and through the die cells, in and of themseves form no part of the present invention and may take several forms which are known and commercially available in the art. Therefore, in order not to obscure the invention, the die cell construction of one such known type of wafering apparatus has been illustrated somewhat schematically in the drawing in conjunction with a control system for controlling the operation thereof to prevent a clogging or choking condition of the hay therewithin during the wafering operation to thereby provide a more uniform rate of flow of hay therethrough, and to prevent stalling of the engine driving the rotary hay compression means. On the other hand, reference may be made to the copending United States patent application, Serial No. 235,471, entitled, "Hay Wafering Method and Apparatus," and filed November 5, 1962, in the name of Stanley L. Lawrence for a more detailed description of one type of wafering apparatus with which the present invention may be utilized.

Referring now to the drawings, the numeral 10 generally indicates a wafering apparatus of the type including a pair of oppositely relatively closely spaced annular plate-like end die wall members 12, and an annular or circumferentially spaced series of knife edges 14 which extend between and have their opposite ends fixedly secured to the end die wall members 12 a suitable distance radially inwardly from the outer peripheries of the latter. An annular or circumferentially spaced series of pairs of side die wall members 15 and 16 are disposed between the end die wall members 12, and have their radially inner ends suitably pivotally connected as indicated at 18 to the radially outer edges of the respective knife edges 14 and diverge radially outwardly from such connections to form an annular or circumferentially spaced series of axially open die cells indicated generally at 20 between end die wall members 12 and respective oppositely spaced and radially outwardly convergent side die wall members 15 and 16 of an adjacent pair thereof.

The die wall construction aforedescribed defines therebetween a wafering chamber indicated at 22. A rotary hay compression or compaction means comprises a drive shaft 24 suitably rotatably mounted relative to and extending between the end die wall members 12 substantially centrally of the annular series of die cells 20, and the radially extending arm means 26 having its central portion suitably rigidly secured to the drive shaft for rotation therewith within the wafering chamber 22, and rotatably journaling at the opposite ends thereof a pair of compaction or compression rollers 28, only one of which being shown in the drawing. The drive shaft 24 is adapted to be suitably coupled to, as by means of a pulley system, and driven by an internal combustion engine not shown in detail but represented in the drawing schematically by a component 30 thereof which, in this instance, is its intake manifold for supplying a fuel-air charge to the cylinders of the engine. However, as the description of the invention proceeds, it will become readily apparent that other portions or components of such engine rather than its intake manifold may be utilized to provide a signal indicative of engine operating conditions to control the die cell construction of the wafering apparatus in a manner to be described hereinafter.

At this juncture, it may be noted that the rollers 28 are positioned so as to be closely spaced to but not engage the knife edges 14 and the entrance ends to the respective die cells 20 disposed opposite the rotary path of travel of the rollers. Thus, hay may be picked-up in a continuous fashion, preferably from a windrow within a field by any one of the well known crop pick-up mechanisms, and delivered into a known hopper construction communicating with the wafering chamber 22 from which it is fed, as by a multiple flight feed auger disposed in the aforementioned hopper, continuously into the wafering chamber 22 and laid across the knife edges 14 and the entrance ends of the respective die cells in advance of the rotative path of travel of the rollers 28. The rollers 28, upon successive rotative passes thereof, act to force the hay past the knife edges and compact and compress it into and through the respective die cells to result in extrusions of hay emerging from the exit ends of each of the die cells. Preferably, and again as is known in the art, such extrusions of hay engage ejection plates or other ejection means at the exit ends of the respective die cells, so as to break the respective extrusions to form wafers which then fall from the wafering apparatus preferably into a conveyor mechanism for removal therefrom.

During normal wafering operations, the cross sectional areas of the respective die cells preferably converge radially outwardly from the entrance ends toward the exit ends thereof due to the fact that the respective oppositely disposed side die wall members 15 and 16 forming a part of each die cell converge in this manner. In order to adjust the degree of convergence of the cross sectional areas of each of the die cells, an hydraulically operated motor assembly 32 of the type comprising relatively reciprocable piston and cylinder elements is interposed between each hinged pair of side die wall members 15 and 16 to control their angular relationship about their hinge points 18. Each of the motor assemblies 32 is individually connected by a conduit 34 to a common fluid manifold 36 adapted to be supplied with fluid under pressure in a manner to be described to control the convergent cross sectional areas of the respective die cells during the wafering operation.

Referring now to the system for controlling the convergent cross sectional areas of the respective die cells 20, the numeral 38 generally indicates a primary control system comprising a suitable pump 40 drawing fluid from a reservoir 42 and supplying it under pressure to the supply conduit 44 which communicates through the conventional manually operable selector valve 46 with the manifold 36 and, hence, with each of the motor assemblies 32. A conventional manually adjustable spring-biased pressure regulator valve 48 including passageway means 49 is connected to the delivery side of the pump 40 whereby, by adjusting the spring pressure of the regulator valve and shifting of the latter to the right in the drawing to connect passageway means 49 with the reservoir in the usual manner, any desired pump delivery or control pressure can be selected for supply through the supply conduit 44 and manual selector valve 46 to the manifold 36, resulting in angular adjustment of the respective side die wall members 15 and 16 to a substantially uniform extent and, hence, an initial pre-selected substantially uniformly convergent cross sectional area for each of the respective die cells 20 between their entrance and exit ends. As will be readily apparent, in the normal open position of the manually operable selector valve 46 as illustrated in the drawing, fluid at the aforementioned pre-selected delivery or control pressure is supplied by the pump through supply conduit 44 and valve passageway means 51 to manifold 36 and motor assemblies 32 for the purpose immediately aforementioned. On the other hand, the selector valve may be shifted to the right in the drawing to communicate the supply conduit 44 through valve passageway means 53 to the reservoir 42 and thereby dump the pump and relieve the pre-selected control pressure initially applied to the motor assemblies 32 to permit the respective side die wall members 15 and 16 of each pair thereof to hinge toward each other as hay is forced into the die cells and thereby increase the convergent cross sectional areas of the respective die cells 20.

A secondary control system is indicated generally at 50 and comprises the exhaust conduit 52 communicating with the supply conduit 44 and the reservoir 42 through the conventional control valve 54. The control valve is normally disposed in the position illustrated in the drawing in which it prevents communication of fluid pressure from the supply conduit 44 through the exhaust conduit 52 to the reservoir, and is movable to a second position to the left in the drawing placing the exhaust conduit in communication with the reservoir through valve passageway means 55 to dump pressure from the supply conduit 44 thereto. The position of the control valve is automatically controlled by energization and de-energization of a conventional electrically operated device such as the solenoid 56 forming part of an electrical control cirucit including the source of electrical power indicated at 58 and connected to the manually movable switch arm 60 of a selector switch 62 further including the two contacts 64 and 66. The respective contacts 64 and 66 are connected through the respective leads 68 and 70 to a movable switch member 72 and a contact 74 of a conventional vacuum-operated control switch 76 which, in turn, is connected through suitable conduit means 78 to the intake manifold 30 of the internal combustion engine driving the drive shaft 24 for the rotary hay compression means as aforedescribed. The lead 80 electrically connects the lead 70 to the solenoid 56, with the latter grounded as illustrated in the drawing.

With the movable switch arm 60 disposed in a neutral position out of engagement with contacts 64 and 66 as shown in the drawing, the aforedescribed circuit means is completely deactivated to prevent energization of the solenoid 56 and shifting the control valve 54 to the left under any circumstances. However, the movable switch arm 60 may be moved to engage the contact 64 and to activate the circuit means through the vacuum-operated control switch 76 whereby, upon movement of the switch arm 72 thereof into engagement with contact 74 in response to a predetermined decrease in the vacuum in the intake manifold 30 in a manner to be described hereinafter, the solenoid 56 is energized through leads 70 and 80 to move the control valve 54 from the position illustrated in the drawing to the left to communicate the supply conduit 44 with reservoir 42 through the exhaust conduit 52. On the other hand, the movable switch arm 60 of the selector switch 62 may be moved into engagement with the contact 66 in which event the circuit means is deactivated through the vacuum responsive switch 76 to render the latter nonresponsive to changes in manifold vacuum, while directly energizing the solenoid 56 through leads 70 and 80 to move the control valve 54 to the left in the drawing to dump pressure from the supply conduit 44 through the exhaust conduit 52 to reservoir 42 as aforedescribed.

In operation, it may be assumed that the operator of the wafering apparatus has adjusted the regulator valve 48 in accordance with various wafering conditions encountered at a particular time to provide a pre-selected delivery or control pressure for the fluid supplied by the pump 40 to the supply conduit 44 and, with the manual selector valve 46 in the position illustrated in the drawing, fluid under such pressure is thereby supplied to the manifold 36 and, hence, through the individual conduits 34 to the respective motor assemblies 32 to initially dispose the side die wall members 15 and 16 in positions to provide substantially uniform convergence of the areas of the respective die cells 20 between the entrance and exit ends threof. Thereafter, hay to be wafered is fed to the wafering chamber 22 as aforedescribed and the engine drives the rotatable drive shaft 24 to propel the rotary hay compaction means including the rollers 28 in successive rotary paths to compress and compact the hay into and through the respective die cells. At any time desired, and irrespective of operation of the secondary control system 50, the vehicle operator merely by manually shifting the selector valve 46 to the right in the drawing, can dump the supply conduit 44 and the aforementioned control pressure to the reservoir, thereby permitting the cross sectional areas of the respective die cells to increase as hay is forced therein to alleviate any clogging or choking action occurring therein.

On the other hand, with the selector valve 46 disposed in the normal operating position shown in the drawing and the rotary hay compaction means being driven by the engine as represented by the intake manifold 30, it may be assumed that the control switch 62 has its switch arm 60 engaged with the contact 64 to activate the circuit means through vacuum-responsive switch 76 for automatically operating the control valve 54 in response to changes in vacuum in the intake manifold 30. Under such conditions, it may be further assumed that hay tends to clog or choke one or more of the die cells to such an extent as to impose a predetermined load on the engine as will be reflected by a decrease in the speed thereof and a decrease in the vacuum within the intake manifold 30. Such a predetermined change in manifold vacuum will be communicated through the conduit 78 to the vacuum-responsive switch 76 causing the switch member 72 thereof to close on the contact 74, thereby making a circuit from the power source 58 through lead 68, vacuum-responsive switch 76, and leads 70 and 80 to the solenoid 56 and ground. Under these conditions, the control valve 54 will be shifted to the left in the drawing to communicate the supply conduit 44 to the reservoir and, since the selector valve 46 is in the position shown, to relieve not only pump pressure but the control pressure within the manifold 36 and motor assemblies 32 to allow the convergent cross sectional areas of the die cells to increase as hay is forced therein to permit the clogging hay to pass therethrough.

At such time as the clogging or choking condition is alleviated, the load on the engine will be reduced and result in the latter speeding up and, in the final analysis, an increase in manifold vacuum which is communicated through the conduit 78 to the vacuum-responsive switch 76, resulting in opening of the latter and breaking of the circuit to the solenoid 56 to permit the control valve 54 to return to its normal position as illustrated in the drawing in the usual manner. At this time, the pump again applies the aforementioned control pressure to the motor assemblies 32 so as to again dispose the die cells in their initial pre-selected positions.

It will be readily apparent that, under the conditions aforedescribed and with the selector switch 62 in a circuit closing position relative to the contact 64, the electrical circuit means can continuously cycle in response to variations in loads on the engine occasioned by clogging or choking conditions in the die cells to intermittently as required permit the die cells to open as hay is forced therein and permit the clogging hay to pass therethrough and then automatically close the die cells to their initially selected positions after the clogging condition has been alleviated. Thus, the control system as aforedescribed will continuously automatically monitor the hay compression operation and permit an increase in the areas of the respective die cells in response to such clogging and choking conditions, thereby alleviating such conditions, preventing overload and stalling of the engine and, in the final analysis, providing a more uniform rate of flow of hay through the die cells than heretofore possible with prior art apparatus of this type.

With the movable switch arm 60 of the selector switch 62 disposed in a neutral position as illustrated in the drawing, the aforedescribed circuit means through the vacuum-responsive switch member 76 may be completely deactivated whereby fluctuations in manifold vacuum, while operating the vacuum-responsive switch, will be prevented from making any circuit through the solenoid 56 and, hence, prevent shifting of the control valve 54 to the left. On the other hand, the operator of the apparatus may manually position the switch arm 60 in current-conducting relation with the contact 66, at which time the solenoid 56 is directly actuated independently of the vacuum-responsive switch to shift the control valve 54 to the left as aforedescribed.

The embodiments of the invention in which an exclusive property or privilege is claimed are defined as follows.

1. In an apparatus for making compressed hay wafers, and of the type including a series of die cells each being adjustably convergent in cross sectional area between entrance and exit ends thereof, and a plurality of fluid pressure operated motor means operating upon said die cells to control the convergent cross sectional areas thereof, the entrance ends of said die cells being disposed opposite rotary hay compression means for compressing hay into and through said die cells to form wafers; the improvement comprising primary control means for supplying fluid under a pre-selected control pressure to said motor means to substantially uniformly initially adjust the convergent cross sectional areas of said die cells, and secondary control means for automatically relieving said control pressure from said motor means to permit an increase in the convergent cross sectional areas of said die cells as hay is forced therein in response to a predetermined decrease in the rate of flow of hay being compressed therethrough.

2. In an apparatus for making compressed hay wafers, and of the type including a series of axially open die cells each including axially opposite entrance and exit ends and opposed movable wall means extending therebetween to adjustably vary the convergent cross sectional area thereof between said entrance and exit ends, a plurality of fluid pressure operated motor means respectively operatively connected between said wall means of each adjacent pair of die cells of said series thereof and being operable to control the convergent cross sectional areas of said die cells, and fluid manifold means communicating with each of said motor means, the entrance ends of said die cells being disposed opposite rotary hay compression means for compressing hay into and through said die cells to form wafers; the improvement comprising a source of fluid under a pre-selectable control pressure, supply conduit means communicating said source with said manifold means, exhaust conduit means including control valve means communicating with said manifold means, said control valve means being movable between a first position preventing flow of fluid through said exhaust conduit means and a second position permitting flow of fluid therethrough, and means for automatically moving said control valve means to said second position thereof to relieve said control pressure from said manifold means and permit an increase in the convergent cross sectional areas of said die cells as hay is forced therein in response to a predetermined decrease in the rate of flow of hay being compressed therethrough.

3. The apparatus according to claim 2 wherein said means for automatically moving said control valve means comprises an electrically operated valve operator, electrical circuit means including control switch means connected to said valve operator, said control switch means being movable between a first position opening said circuit means to de-energize said valve operator and dispose said control valve means in said first position thereof and a second position closing said circuit means to energize said valve operator and move said control valve means to said second position thereof, and means for automatically moving said control switch means from said first position thereof to said second position thereof in response to said predetermined decrease in the rate of flow of hay being compressed through said die cells.

4. The apparatus according to claim 3 wherein said circuit means further comprises manually operable selector switch means having a neutral position de-energizing said circuit means, a second position energizing said circuit means through said control switch means, and a third position de-energizing said circuit means through said control switch means and energizing said valve operator.

5. The apparatus according to claim 3 wherein said supply conduit means further comprises manually operable selector valve means movable between a first position communicating said source with said manifold means and a second position relieving said control pressure therefrom.

6. The apparatus according to claim 3 wherein said source of fluid under a pre-selectable control pressure comprises pump means supplying fluid under pressure to said supply conduit means, and adjustable pressure regulator valve means for pre-selecting the delivery pressure of said pump means.

7. In an apparatus for making compressed hay wafers, and of the type including a series of die cells each being adjustably convergent in cross sectional area between entrance and exit ends thereof, a plurality of fluid pressure operated motor means operating upon said die cells to control the convergent cross sectional areas thereof, the entrance ends of said die cells being disposed opposite rotary hay compression means for compressing hay into and through said die cells to form wafers, and engine means driving said rotary hay compression means; the improvement comprising primary control means for supplying fluid under a pre-selected control pressure to said motor means to substantially uniformly initially adjust the convergent cross sectional areas of said die cells, and secondary control means for automatically relieving said control pressure from said motor means to permit an increase in the convergent cross sectional areas of said die cells as hay is forced therein in response to a predetermined change in an operating condition of said engine means.

8. In an apparatus for making compressed hay wafers, and of the type including a series of die cells each being adjustably convergent in cross sectional area between entrance and exit ends thereof, a plurality of fluid pressure operated motor means operating upon said die cells to control the convergent cross sectional areas thereof, the entrance ends of said die cells being disposed opposite rotary hay compression means for compressing hay into and through said die cells to form wafers, and engine means driving said rotary hay compression means; the improvement comprising primary control means for supplying fluid under a pre-selected control pressure to said motor means to substantially uniformly initially adjust the convergent cross sectional areas of said die cells, and secondary control means for automatically relieving said control pressure from said motor means to permit an increase in the convergent cross sectional areas of said die cells as hay is forced therein in response to a predetermined decrease in the operating speed of said engine means.

9. In an apparatus for making compressed hay wafers, and of the type including a series of axially open die cells each including axially opposite entrance and exit ends and opposed movable wall means extending therebetween to adjustably vary the convergent cross sectional area thereof between said entrance and exit ends, a plurality of fluid pressure operated motor means respectively operatively connected between said wall means of each adjacent pair of die cells of said series thereof and being operable to control the convergent cross sectional areas of said die cells, fluid manifold means communicating with each of said motor means, the entrance ends of said die cells being disposed opposite rotary hay compression means for compressing hay into and through said die cells to form wafers, and engine means driving said rotary hay compression means; the improvement comprising a source of fluid under a pre-selectable control pressure, supply conduit means communicating said source with said manifold means, exhaust conduit means including control valve means communicating with said manifold means, said control valve means being movable between a first position preventing flow of fluid through said exhaust conduit means and a second position permitting flow of fluid therethrough, and means for automatically moving said control valve means to said second position thereof to relieve said control pressure from said manifold means and automatically permit an increase in the convergent cross sectional areas of said die cells as hay is forced therein in response to a predetermined decrease in the operating speed of said engine means.

10. The apparatus according to claim 9 wherein said means for automatically moving said control valve means comprises an electrically operated valve operator, electrical circuit means including control switch means connected to said valve operator, said control switch means being movable between a first position opening said circuit means to de-energize said valve operator and dispose said control valve means in said first position thereof and a second position closing said circuit means to energize said valve operator and move said control valve means to said second position thereof, and means for automatically moving said control switch means to said second position thereof in response to said predetermined decrease in the operating speed of said engine.

11. The apparatus according to claim 10 wherein said circuit means further comprises manually operable selector switch means having a neutral position de-energizing said circuit means, a second position energizing said circuit means through said control switch means, and a third position de-energizing said circuit means through said control switch means and energizing said valve operator.

12. The apparatus according to claim 10 wherein said supply conduit means further comprises manually operable selector valve means movable between a first position communicating said source with said manifold means and a second position relieving said control pressure therefrom.

13. The apparatus according to claim 10 wherein said source of fluid under a pre-selectable control pressure comprises pump means supplying fluid under pressure to said supply conduit means, and adjustable pressure regulator valve means for pre-selecting the delivery pressure of said pump means.

14. In an apparatus for making compressed hay wafers, and of the type including an annular series of axially open die cells each being adjustably convergent in cross sectional area between axially opposite entrance and exit ends thereof, a plurality of fluid pressure operated motor means operating upon said die cells to control the convergent cross sectional areas thereof, the entrance ends of said die cells being circumferentially spaced about a rotary hay compression means for compacting hay into and through said die cells to form wafers, and an internal combustion engine including intake manifold means driving said rotary hay compression means; the improvement comprising primary control means for supplying fluid under a pre-selected control pressure to said motor means to substantially uniformly initially adjust the convergent cross sectional areas of said die cells, and secondary control means for automatically relieving said control pressure from said motor means to permit an increase in the convergent cross sectional areas of said die cells as hay is forced therein in response to a predetermined decrease in the vacuum in said intake manifold means.

15. In an apparatus for making compressed hay wafers, and of the type including a series of axially open die cells each including axially opposite entrance and exit ends and opposed movable wall means extending therebetween to adjustably vary the convergent cross sectional area thereof between said entrance and exit ends, a plurality of fluid pressure operated motor means respectively operatively connected between said wall means of each adjacent pair of die cells of said series thereof and being operable to control the convergent cross sectional areas of said die cells, fluid manifold means communicating with each of said motor means, the entrance ends of said die cells being disposed opposite rotary hay compression means for compacting hay into and through said die cells to form wafers, and an internal combustion engine including intake manifold means driving said rotary hay compression means; the improvement comprising a source of fluid under a pre-selectable control pressure, supply conduit means communicating said source with said manifold means, exhaust conduit means including control valve means communicating with said manifold means, said control valve means being movable between a first position preventing flow of fluid through said exhaust conduit means and a second position permitting flow of fluid therethrough, and means for automatically moving said control valve means to said second position thereof to relieve said control pressure from said manifold means and automatically permit an increase in the convergent cross sectional areas of said die cells as hay is forced therein in response to a predetermined decrease in the vacuum in said intake manifold means.

16. The apparatus according to claim 15 wherein said means for automatically moving said control valve means comprises an electrically operated valve operator, electrical circuit means including control switch means connected to said electrical valve operator, said control switch means being movable between a first position opening said circuit means to de-energize said valve operator and dispose said control valve means in said first position thereof and a second position closing said circuit means to energize said valve operator and move said control valve means to said second position thereof, and means for automatically moving said control switch means to said second position thereof in response to said predetermined decrease in the vacuum in said intake manifold means.

17. The apparatus according to claim 16 wherein said circuit means further comprises manually operable selector switch means having a neutral position de-energizing said circuit means, a second position energizing said circuit means through said control switch means, and a third position de-energizing said circuit means through said control switch means and energizing said valve operator.

18. The apparatus according to claim 16 wherein said supply conduit means further comprises manually operable selector valve means movable between a first position communicating said source with said manifold means and a second position relieving said control pressure therefrom.

19. The apparatus according to claim 16 wherein said source of fluid under a pre-selectable control pressure comprises pump means supplying fluid under pressure to said supply conduit means, and adjustable pressure regulator valve means for pre-selecting the delivery pressure of said pump means.

20. In an apparatus for making compressed hay wafers, and of the type including a plurality of die cells having adjustable cross sectional areas between the ends thereof, and means for compressing hay through said die cells; the improvement comprising means automatically responsive to clogging of the flow of hay being compressed through any one of said die cells to permit an increase in the cross sectional areas of all thereof as hay is being compressed therein.

21. In an apparatus for making compressed hay wafers, and of the type including a plurality of die cells each being adjustably convergent in cross sectional area between entrance and exit ends thereof, the entrance ends of said die cells being disposed opposite means for compressing hay into and through said die cells to form wafers; the improvement comprising means automatically responsive to clogging of hay being compressed through any one of said die cells to permit an increase in the convergent cross sectional areas of all thereof as hay is being compressed therein.

References Cited by the Examiner

UNITED STATES PATENTS

| | | | |
|---|---|---|---|
| 2,340,009 | 1/1944 | Meakin | 100—43 |
| 2,582,672 | 1/1952 | Bobst | 100—43 |
| 3,062,129 | 11/1962 | Wandel | 100—43 |
| 3,085,502 | 4/1963 | Hurtig | 100—43 |
| 3,090,182 | 5/1963 | Johnson et al. | 56—1 |

FOREIGN PATENTS 1,234,427 5/1960 France.
1,250,174 11/1960 France.

OTHER REFERENCES

Agricultural Engineering, August 1961, pages 412–415 and 423.

Western Livestock Journal, April 1961, pages 36 and 29.

WALTER A. SCHEEL, *Primary Examiner.*